United States Patent [19]

Gilliland

[11] Patent Number: 5,515,948
[45] Date of Patent: May 14, 1996

[54] PROTECTED TRANSFER PORTING IN BRAKE CALIPER UNIT WITH OPPOSED PISTONS

[76] Inventor: Warren L. Gilliland, 2455 Blanchard Rd., Camarillo, Calif. 93012

[21] Appl. No.: 433,166

[22] Filed: May 3, 1995

[51] Int. Cl.[6] .......................... F16D 65/32; B60T 11/00
[52] U.S. Cl. ................ 188/72.5; 188/264 F; 188/369
[58] Field of Search ........................ 188/72.4, 72.5, 188/73.44, 73.45, 106 F, 254 CC, 264 D, 264 F, 264 R, 369

[56] References Cited

U.S. PATENT DOCUMENTS

| | | |
|---|---|---|
| Re. 24,996 | 6/1961 | Butler . |
| 2,915,147 | 12/1959 | Davis . |
| 3,420,342 | 1/1969 | Botterill ........................ 188/264 F |
| 3,708,043 | 1/1973 | Rath et al. . |
| 4,093,043 | 6/1978 | Smith . |
| 4,159,754 | 7/1979 | Airheart et al. ...................... 188/71.8 |
| 4,180,146 | 12/1979 | Airheart ............................. 188/71.8 |
| 4,799,575 | 1/1989 | Kroniger ........................... 188/264 F |
| 5,181,588 | 1/1993 | Emmons . |
| 5,205,383 | 4/1993 | Terashima . |
| 5,249,649 | 10/1993 | Emmons . |
| 5,343,985 | 9/1994 | Thiel et al. . |
| 5,358,077 | 10/1994 | DeConti ........................... 188/264 D |
| 5,363,944 | 11/1994 | Thiel et al. . |
| 5,394,963 | 3/1995 | Deaue et al. ..................... 188/264 D |
| 5,445,242 | 8/1995 | Pogorzelski ................... 188/264 CC |

FOREIGN PATENT DOCUMENTS

| | | |
|---|---|---|
| 2459909 | 1/1981 | France . |
| 3613346 | 10/1987 | Germany . |
| 3906162 | 8/1990 | Germany . |
| 6081867 | 3/1994 | Japan .............................. 188/264 D |
| 936222 | 1/1960 | United Kingdom . |

Primary Examiner—Robert J. Oberleitner
Assistant Examiner—Chris Schwartz
Attorney, Agent, or Firm—William W. Haefliger

[57] ABSTRACT

A brake assembly, for causing brake pads to brake a rotor having opposite sides, comprises first and second caliper sections, and piston chambers associated with the sections. Pistons are movable in the chambers to cause the pads to frictionally engage the opposite sides of the rotor. Structure interconnects the caliper sections; and there is porting in the structure to transmit fluid pressure to the chambers to cause the pistons to displace the pads to frictionally grip the rotor, for braking same.

14 Claims, 3 Drawing Sheets

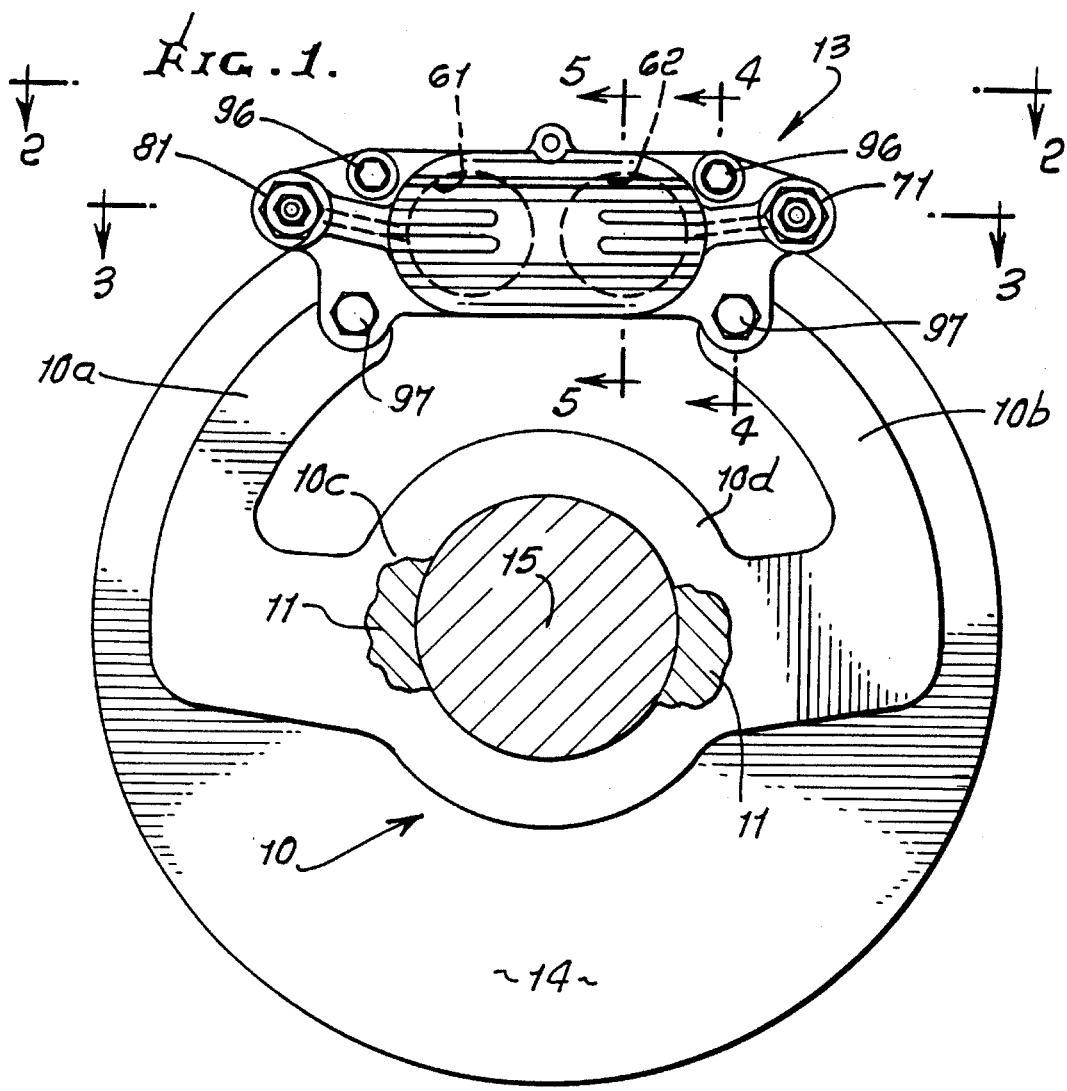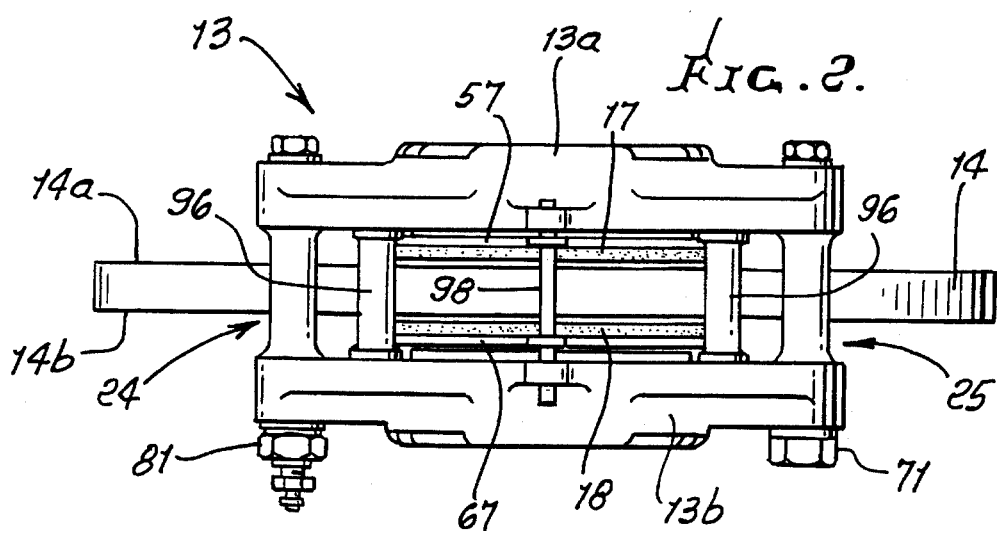

PROTECTED TRANSFER PORTING IN BRAKE CALIPER UNIT WITH OPPOSED PISTONS

BACKGROUND OF THE INVENTION

This invention relates generally to brake calipers, and operation thereof; more particularly, it concerns improvements in racing brake calipers in which fluid pressure is transmitted between caliper sections at opposite sides of a rotor to be braked.

Current racing brake calipers utilize two caliper halves, which are clamped together at the rotor center line by bolts which go through a non-high tolerance hole in one half and into a relatively low tolerance threaded hole in the other half. This allows for a potential "parallelagraming" of the two caliper halves, resulting in the pad cocking, with respect to the rotor face and subsequently causing an increase in pad drag and wear, and a decrease in braking efficiency. Additionally, present designs have a considerable air circulation blockage at the point of the clamping of the two halves together. A final design weakness of the current designs is the use of an external, thin, easily damaged fluid supply tube that crosses from one caliper half to the other. Also, because of this, the required tube end fittings present an additional point of leakage.

There is need for improvements that overcome the above problems and design deficiencies.

SUMMARY OF THE INVENTION

It is a major object of the invention to provide such needed improvements. Basically, the brake assembly of the invention is configured to brake a rotor, such as a disc, having opposite sides, and includes:

a) first and second caliper sections, b) there being piston chambers associated with the sections, and there being pistons movable in the chambers to cause the pads to frictionally engage the opposite sides of the rotor, c) structure interconnecting the caliper sections, d) and there being porting, including porting in the structure to transmit fluid pressure to the chambers to cause the pistons to displace the pads to frictionally grip the rotor, for braking same.

As will be seen, such structure may include at least one spacer extending between the caliper sections to transmit connection loading between the sections, the spacer containing porting to also transmit fluid pressure between the caliper sections; and typically, there are at least two such spacers, separated along the rotor travel path, the spacers being generally tubular.

It is another object of the invention to provide multiple piston chambers located between two of the tubular members, to which the caliper sections are clamped; and the two tubular members typically extend in parallel relation.

A further object is to provide elements connected to end extents of the spacers and acting to transmit clamping force to the caliper sections, the spacers located to hold the sections in predetermined spaced relation.

An additional object is to provide interfitting of the spacers with the calipers, to prevent cocking of the calipers.

Yet another object is to provide means for communicating fluid pressure to the porting via end extent of at least one of the tubular spacers.

These and other objects and advantages of the invention, as well as the details of an illustrative embodiment, will be more fully understood from the following specification and drawings, in which:

DRAWING DESCRIPTION

FIG. 1 is a side elevation showing a disc brake assembly incorporating the invention;

FIG. 2 is a plan view taken on lines 2—2 of FIG. 1;

DETAILED DESCRIPTION

Figure 3:
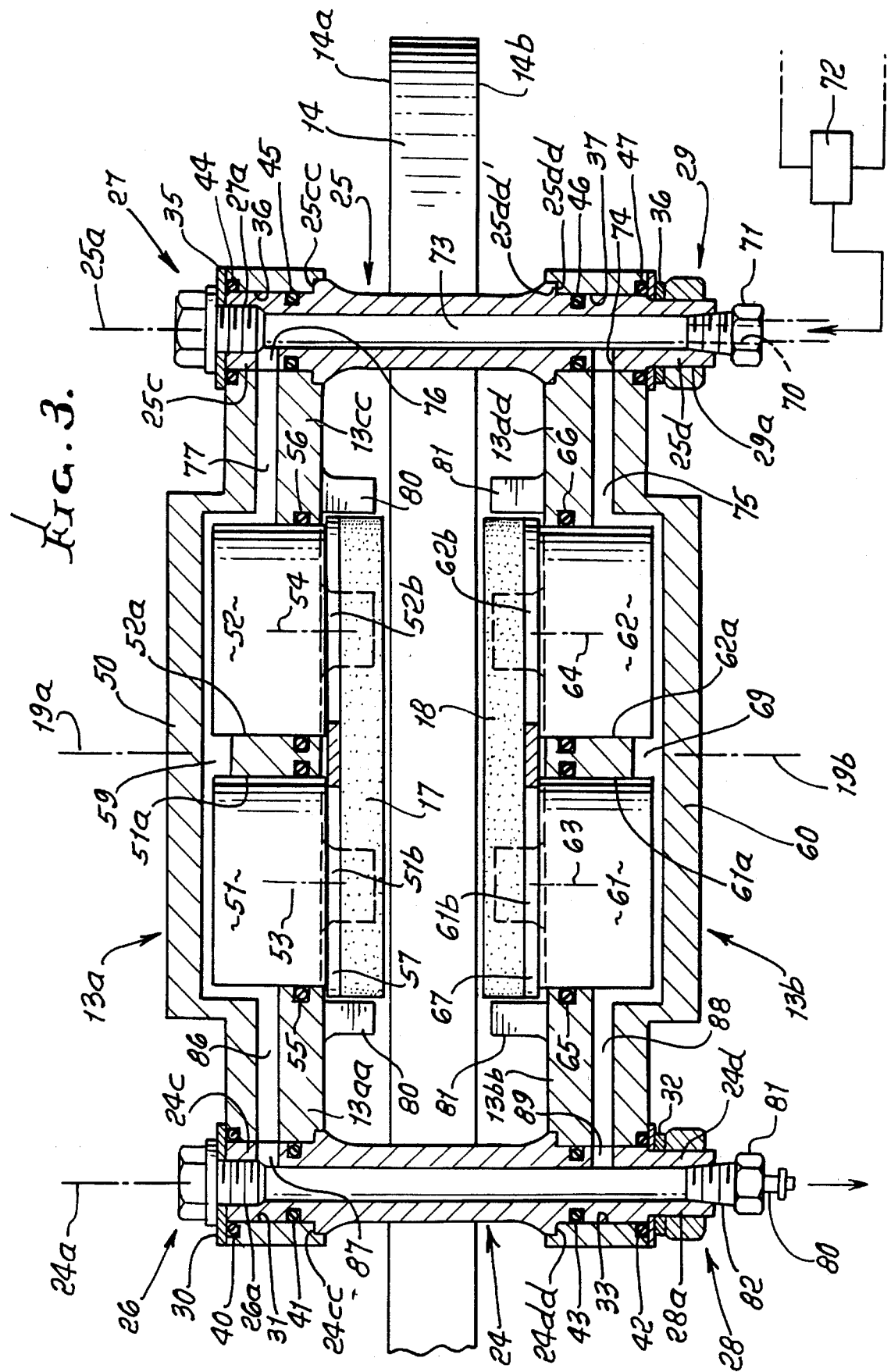
FIG. 3 is an enlarged section taken on lines 3—3 of FIG. 1.

In FIG. 1, a torque arm 10 includes extents 10a and 10b project oppositely from arm portions 10c and 10d. The latter are adapted to be connected to non-rotary structure indicated at 11, associated with a vehicle. Structure 11 may for example be an axle flange.

The torque arm extents 10a and 10b support a caliper assembly 13 straddling a rotor, such as a disc 14. The disc rotates about axis 15 relative to the caliper assembly, and has opposite sides or faces 14a and 14b to be engaged by brake pads 17 and 18. See for example pad 17 engageable against disc side 14a, and pad 18 engageable against disc side 14b. The pads are respectively carried by plates 57 and 67 carried for axial shifting, in the directions of lateral axes 19a and 19b, generally parallel to axis 15, in response to braking force transmission to the plates.

The caliper assembly 13 includes first and second sections, indicated for example at 13a and 13b. Structure is provided to rigidly interconnect those sections, and to bear and transmit loading developed during braking. Such structure typically includes at least one spacer extending between the caliper sections to transmit interconnection loading between the sections, the spacer containing porting to also transmit fluid pressure between the caliper sections. Preferably, there are at least two of said spacers, in generally tubular form, as indicated at 24 and 25. They are shown as extending in generally parallel relation, having axes 24a and 25a, parallel to axis 15; also, they are separated from one another along the rotor rotary travel path, and extend across and near the rotor outer rim, as is clear from FIGS. 1 and 2.

Referring to FIG. 3, the structure includes elements, as at 26–29 connected to end extents of the tubular spacers 24 and 25, to transmit clamping force to the caliper sections, for holding those sections in predetermined spaced relation, relative to the disc rotor 14. For example, bolt 26 has a stem thread connected at 26a to tubular end portion 24c of spacer 24, and a head clamping a washer 30 against outer side of caliper section 13a reduced thickness portion 13aa. The latter has a bore 31 receiving the spacer end portion 24c, which has a shoulder 24cc seating the received opposite side of 13aa. Therefore, caliper section 13a and spacer 24 are locked together against relative twist and against relative separation in the direction of axis 24a. See also O-ring seals 40 and 41.

Element 28, which may be a nut, is suitably connected at 28a to the tubular opposite end portion 24d of spacer 24, and clamps a washer 32 against outer side of caliper section 13b reduced thickness portion 13bb. The latter has a bore 33 receiving the spacer end portion 24d, which has a shoulder 24dd seating the recessed inner side of 13bb. Accordingly, caliper section 13b and spacer 24 are locked together against relative twist and against relative separation in the direction of axis 24a. See also O-ring seals 42 and 43. Spacer 24 extends over the rotor rim 14a, as shown.

Bolt 27 has a stem thread connected at 27a to tubular end portion 25c of spacer 25; and a head clamping a washer 35 against outer side caliper section 13a reduced thickness portion 13cc. The latter has a bore 36 receiving the spacer end portion 25c, which has a shoulder 25cc seating the received opposite side of 13cc. Therefore, caliper section 13a and spacer 25 are locked together against relative twist and against relative separation in the direction of axis 25a. See also O-ring seals 44 and 45.

Element 29, which may be a nut, is suitably connected at 29a to the tubular opposite end portion 25d of spacer 25, and clamps a washer 36 against outer side of caliper section 13b reduced thickness portion 13dd. The latter has a bore 37 receiving the spacer end portion 25d, which has a shoulder 25dd seating the recessed inner side of 13dd. Shoulder 25dd is on a flange 25dd' on the spacer. Accordingly, caliper section 13b and spacer 25 are locked together against relative twist, against relative cocking, and against relative separation in the direction of axis 25a. See also O-ring seals 46 and 47. Spacer 25 extends over the rotor rim 14a, as shown.

Piston chambers are associated with the caliper sections, and pistons are movable in the chambers to cause brake pads to frictionally engage the rotor disc opposite sides, for braking. In the example shown, chamber 50, integral with caliper section 13a, contains two parallel arranged pistons 51 and 52, having parallel laterally extending axes of movement 53 and 54. Piston 51 slides in a bore 51a, and piston 52 slides in a bore 52a, there being O-ring seals 55 and 56 sealing off between the pistons and such bores. Piston stems 51b and 52b are received through openings 57a and 57b in a plate 57 carrying brake pad 17. Fluid pressure supplied to cavity 59 in chamber 50 causes the pistons to displace the plate and pad toward the side 14a of the disc 14, for braking same.

Likewise, chamber 60, integral with caliper section 13b, contains two parallel-arranged pistons 61 and 62, having parallel laterally extending axes of movement 63 and 64. Piston 61 slides in a bore 61a, and piston 62 slides in a bore 62a, there being O-ring seals 65 and 66 sealing off between the pistons and such bores. Piston stems 61b and 62b are received through openings 67a and 67b in a plate 67 carrying brake pad 18. Fluid pressure supplied to cavity 69 in chamber 60 causes the pistons to displace the plate pad 18 toward the opposite side 14b of the disc 14, for braking same.

Porting is provided in the structure to transmit fluid pressure to cavities 59 and 69 in the chambers 50 and 60, for causing the pistons to simultaneously displace the brake pads 17 and 18, to frictionally grip opposite sides of the rotor, for braking same. As shown, an inlet port 70 in a tubular fitting 71, thread connected to 25d, is supplied with braking fluid pressure, as from a source 72, which may comprise a brake pedal master cylinder for hydraulic braking fluid. The fluid pressure passes into the tubular interior 73 of spacer 25, from which it is supplied via side port 74, and port or duct 75 to piston cavity 69, and via side port 76 and port or duct 77 to piston cavity 59. Note also normally closed bleed outlet 80 at a tubular fitting 81 thread connected at 82 to the end 24d of spacer 24.

Fluid pressure also passes to the interior of the spacer 24, as from ports 86 and 87, and 88 and 89, providing enhancement of pressure equalization in both caliper sections. Spacers 24 and 25 are alike, whereby pressure can alternatively be supplied to 24, and bled from 25, depending upon the installer's needs.

A further advantage is that tubular spacers 24 and 25 extend openly between the caliper sections, providing for enhanced heat transfer from the braking fluid to air flowing over the spacers, via the openly exposed spacer extents.

Guides for the brake pads to guide their movement appears at 80 and 81. They are integral with the caliper sections or halves.

Figure 4:
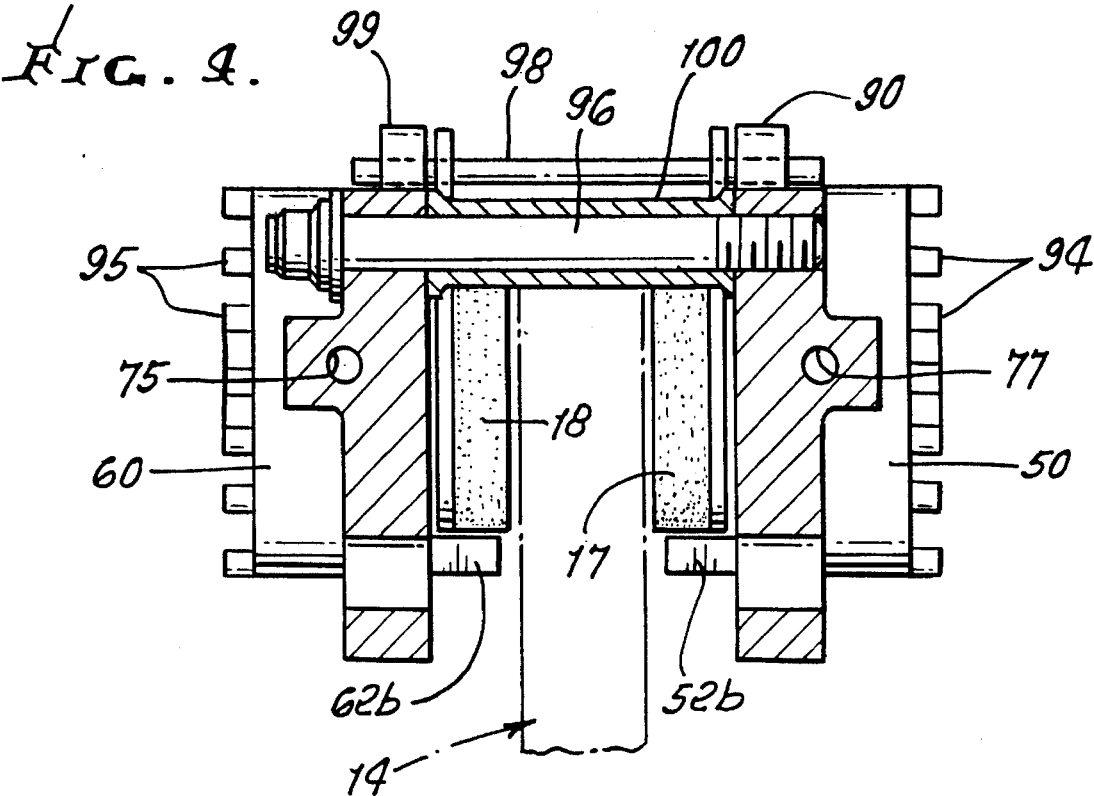
FIG. 4 is an enlarged section taken in elevation on lines 4—4 of FIG. 1.
Figure 5:
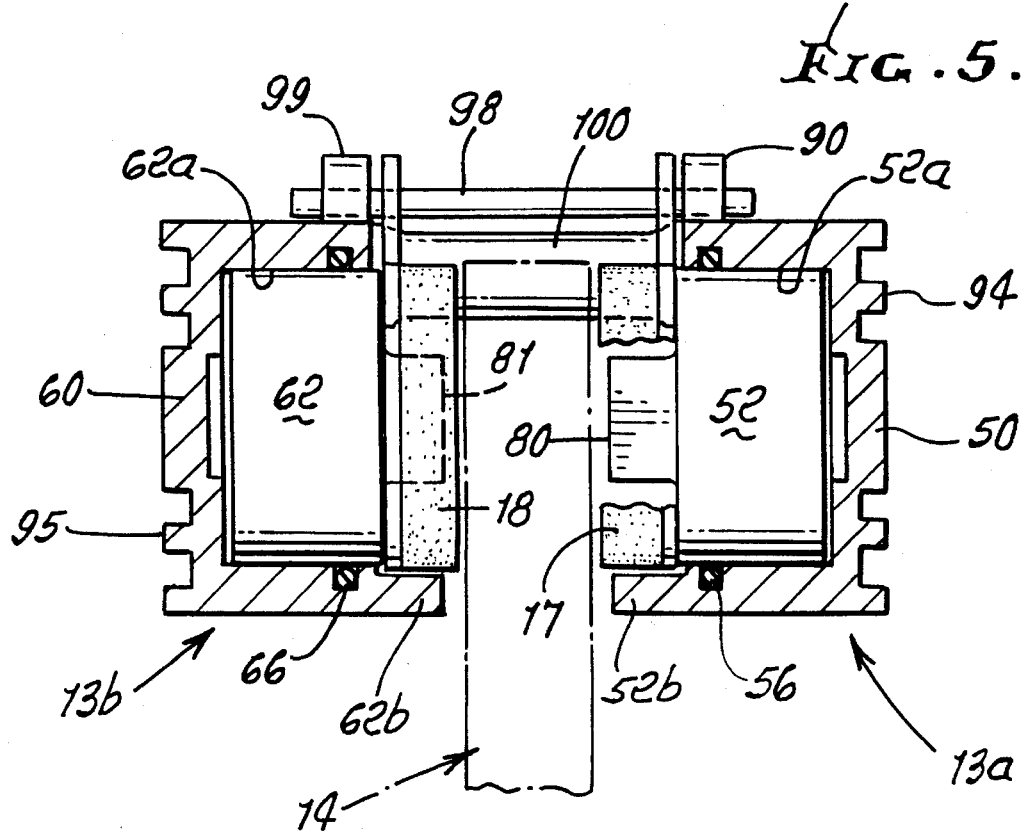
FIG. 5 is an enlarged section taken in elevation on lines 5—5 of FIG. 1.

Bolts interconnecting the caliper sections appear at 86 and 87 in FIG. 2. They extend through auxiliary tubular spacers 100 having ends engaging inner sides of the caliper sections. An alignment pin 88 extends between lugs 89 and 90 on the caliper sections. See FIGS. 4 and 5.

Fins on the piston chamber appear at 94 and 95, for conducting friction-produced heat to the atmosphere.

It will be noted that when the tubular spacers 24 and 25 are alike as shown, and their interfits with the calipers are alike, the spacers are interchangeable, whereby a supplier's inventory of such spacers can be minimized.

I claim:

1. A brake assembly combination, for causing brake pads to brake a rotor having opposite sides, comprising
   a) first and second caliper sections,
   b) piston chambers associated with said sections, and pistons movable in said chambers to cause said pads to frictionally engage said opposite sides of the rotor,
   c) structure interconnecting said caliper sections,
   d) and porting in said structure, to transmit fluid pressure to said chambers to cause the pistons to displace the pads to frictionally grip the rotor, for braking the rotor,
   e) said structure including at least one spacer extending between said caliper sections to transmit connection loading between the sections, the at least one spacer containing porting to also transmit fluid pressure between the caliper sections, and holding structure associated with said at least one spacer to hold the sections in predetermined spaced relation,
   f) and wherein said holding structure includes an element connected to an end extent of said at least one spacer acting to transmit clamping force to said caliper sections.

2. The combination of claim 1 wherein there are at least two of said pistons associated with at least one caliper section.

3. The combination of claim 2 wherein said piston chambers are located generally between two spacers, said spacers extending in parallel relation.

4. The combination of claim 3 including bolts and auxiliary tubular parts interconnecting said caliper sections, in spaced relation to said spacers.

5. The combination of claim 1 including at least another spacer, said spacers separated along the rotor travel path, said spacers being generally tubular.

6. The combination of claim 5 wherein said piston chambers are located between said spacers, the caliper sections clamped to said spacers.

7. The combination of claim 5 wherein said at least another spacer also contains porting, said spacers being in intercommunication via said porting and piston chambers in the caliper sections.

8. The combination of claim 5 wherein said spacers have integral flanges fitting into recesses formed by said caliper sections to provide rigidity to the connections between the spacers and the caliper sections.

9. The combination of claim 5 wherein said spacers are alike.

10. The combination of claim 1 wherein there are at least four of said pistons associated with said caliper sections.

11. The combination of claim 10 wherein said piston chambers are located generally between two tubular spacers, said spacers extending in parallel relation, said pistons having axes extending in parallel relation to said spacers.

12. The combination of claim 1 including means for communicating fluid pressure to said porting.

13. A brake assembly combination, for causing brake pads to brake a rotor having opposite sides, comprising a) first and second caliper sections, b) piston chambers associated with said sections, and pistons movable in said chambers to cause said pads to frictionally engage said opposite sides of the rotor, c) structure interconnecting said caliper sections, d) and porting in said structure, to transmit fluid pressure to said chambers to cause the pistons to displace the pads to frictionally grip the rotor, for braking the rotor, e) said structure including spacers extending between said caliper sections to transmit connection loading between the sections, the spacers containing porting to also transmit fluid pressure between the caliper sections, and holding structure associated with said spacers to hold the sections in predetermined spaced relation, f) and wherein said holding structure includes elements connected to end extents of said spacers and acting to transmit clamping force to said caliper sections, the spacers located to hold the sections in predetermined spaced relation.

14. The combination of claim 3 including means for communicating fluid pressure to said porting via end extent of one of said tubular spacers.

* * * * *